United States Patent
Takeno et al.

[11] 3,750,129
[45] July 31, 1973

[54] CONVEYOR BELT APPARATUS

[76] Inventors: Keigo Takeno; Siichiro Watanabe, both of c/o Tadashi Wakabayoshi Kowa Bldg., No. 10, No. 7-7, 1-chome, Minato-ku, Tokyo, Japan

[22] Filed: Sept. 1, 1971

[21] Appl. No.: 176,937

[30] Foreign Application Priority Data
Sept. 7, 1970 Japan.............................. 45/78379
July 3, 1971 Japan.............................. 46/48988
Feb. 27, 1971 Japan....... 46/12133 (utility model)
May 24, 1971 Japan....... 46/42119 (utility model)

[52] U.S. Cl.............. 340/267 R, 198/40, 324/34 R, 340/259
[51] Int. Cl....................... B65g 43/02, G08b 21/00
[58] Field of Search........................ 340/259, 267 R; 198/40, 193, 232; 324/34 R

[56] References Cited
UNITED STATES PATENTS
3,656,137   4/1972   Ratz.................................... 340/259

*Primary Examiner*—John W. Caldwell
*Assistant Examiner*—Glen R. Swann, III
*Attorney*—Leonard H. King

[57] ABSTRACT

A conveyor belt comprising rubber magnets embedded below the belt surface and magnetically shortcircuited by magnetic members. The magnetic members under the belt surface are displaced from the rubber magnets when longitudinal cracks appear on the belt. Variation in the outside magnetic field of the rubber magnet due to displacement of the magnetic bodies are detected by detectors which indicate the appearance of longitudinal cracks.

14 Claims, 13 Drawing Figures

CONVEYOR BELT APPARATUS

This invention relates to improvements in conveyor belts, and more particularly to a conveyor belt adapted to detect damages such as longitudinal cracks appearing on the surface thereof in the course of traveling of the conveyor belt.

BACKGROUND OF THE INVENTION

In belt conveyor means for transporting ores, coal and like material, usually fragmentary pieces of ores pierce through the belt surface producing longitudinal cracks thereon in the course of traveling of the conveyor belt. The longitudinal cracks produced on the conveyor belt as described above expand along the length of the belt if left intact and eventually requires replacement of the whole belt body. Particularly in a belt having a length as large as several hundred to several thousand meters, the replacement of the belt is a great expense. Therefore, it is of paramount importance to detect the longitudinal cracks and stop the driving motor as soon as possible so as to lessen the damage to a minimum extent.

It has been a usual practice to provide a belt conveyor with conducting wires embedded transversely in the belt at predetermined intervals or as an alternative providing short-circuiting coils at preferred locations in the belt. Thus, the conductors or short-circuiting coils are severed by longitudinal cracks produced on the belt and such severance of the wires or coils is directly detected by a contact means or non-contact induction system so as to stop the driving of the motor and subsequently the motion of the entire conveyor belt. However, the conductors or short-circuiting coils are inevitably affected by repeated bending during the belt operation and sometimes severed before the longitudinal cracks appear on the belt, with the result that the detection cannot be accurately performed with certainty. It is usual for the conveyor belt to perform zigzag or oscillatory movements and the conveyor means is generally installed out of doors. Hence, the above-mentioned contact system has the disadvantage of producing imperfect contact leading to erroneous operation, while with the non-contact system it is very hard to set the location for inductive coupling.

The present invention overcomes the above drawbacks as have heretofore been experienced.

Therefore, a primary object of the present invention is to provide a belt conveyor, by means of which the longitudinal cracks can well be detected without error.

BRIEF DESCRIPTION OF THE DRAWING

The invention will be described in detail with reference to the accompanying drawings, in which.

DESCRIPTION OF THE PREFERRED EMBODIMENTS

Figure 1:
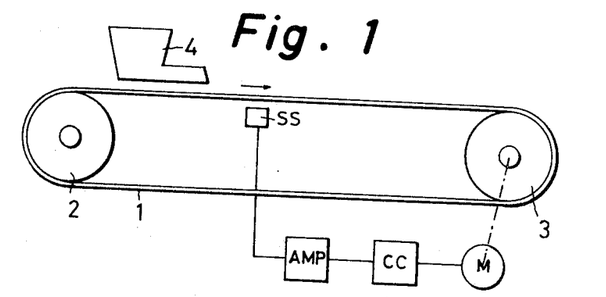
FIG. 1 is a side view of an embodiment of a conveyor belt according to the present invention.
Figure 2:
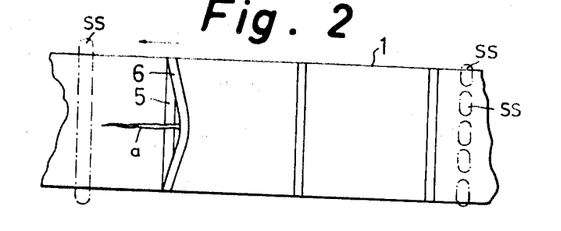
FIG. 2 is a plan view of an essential portion of the conveyor belt shown in FIG. 1.

Referring to FIG. 1, a belt conveyor according to the invention is diagrammatically shown. The belt 1 is shown extending between pulleys 2 and 3 and driven by a motor M. Ores and the like are fed from a chute 4 and carried on the belt rightwardly. Inside the belt 1 are provided detectors SS at preferred locations where longitudinal cracks are probable to occur. When the longitudinal cracks appear on the belt, the output of the detector SS is amplified by an amplifier AMP to actuate a control circuit CC so as to stop the motor M. FIG. 2 shows the belt 1 in which a part of the cover rubber has been taken away. At fixed intervals along the belt are embedded rubber magnets 5 and magnetic bodies 6 such as iron plates transversely in the direction of the belt 1. The rubber magnet 5 has N and S poles transversely on the surface thereof as shown in the cross sectional view of FIG. 3. Here, the belt 1 is made of a rubber material. The rubber magnet 5 can be rigidly fixed on the belt surface without rendering harm to the characteristics of the conveyor belt 1. The magnetic body 6 is provided for magnetically shortcircuiting the rubber magnet 5. The magnetic body 6 being closely held to the rubber magnet 5 by magnetic attracting forces and fixed thereon with a cover rubber 7. A plurality of steel cables 8 may be embedded at fixed intervals through the belt 1.

Usually, the magnetic flux from the rubber magnet 5 passes across the magnetic body 6. A very small amount of magnetic flux will leak to the outside so that the output of the detector SS may be neglected. As seen in FIG. 2, if a longitudinal crack $a$ is produced, the rubber magnet 5 will be cut together with the belt body, but the magnetic body 6 such as an iron plate will only be displaced from the rubber magnet 5 without being cut. The displacement of the magnetic body 6 is shown on the left side of FIG. 3, generally in the manner that it breaks outwardly through the cover rubber 7. In consequence, the magnetic flux from the rubber magnet 5 interlinks the detector SS by which a detecting signal is generated indicating the occurrence of a longitudinal crack. The detectors SS can be such detecting elements of magnetism as induction coils, magnets, diodes, lead relays, or magnetic sensitive resistor elements. As shown on the right in FIG. 2, a plurality of detectors SS may be disposed distributed over the whole width of the belt, or a single extended detector may be disposed as shown on the left in the Figure. If the output of the detection signal is large enough, it can break the control circuit of the motor M.

Figures 3, 4:
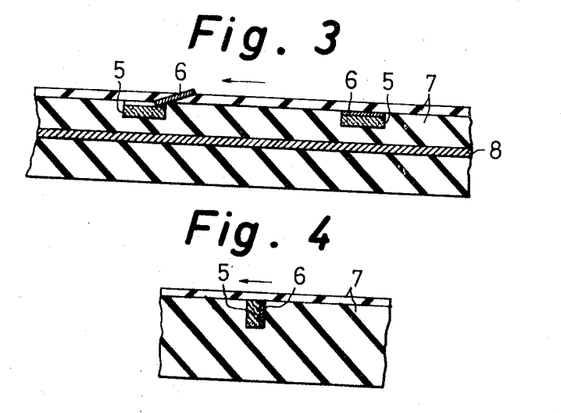
FIG. 3 is a cross section of an embodiment of a conveyor belt according to the invention.
FIG. 4 is a cross section of another embodiment of a conveyor belt according to the invention.

In FIG. 4, the rubber magnet 5 and the magnetic body 6 are shown displaced by 90° as compared with those in FIG. 3. Normally, magnetic shortcircuiting is effected by the magnetic body 6. When the longitudinal cracks appear on the belt, the magnetic body 6 and the rubber magnet 5 are detached from each other, whereby the magnetic flux from the rubber magnet intersects the detector SS.

Figure 5:
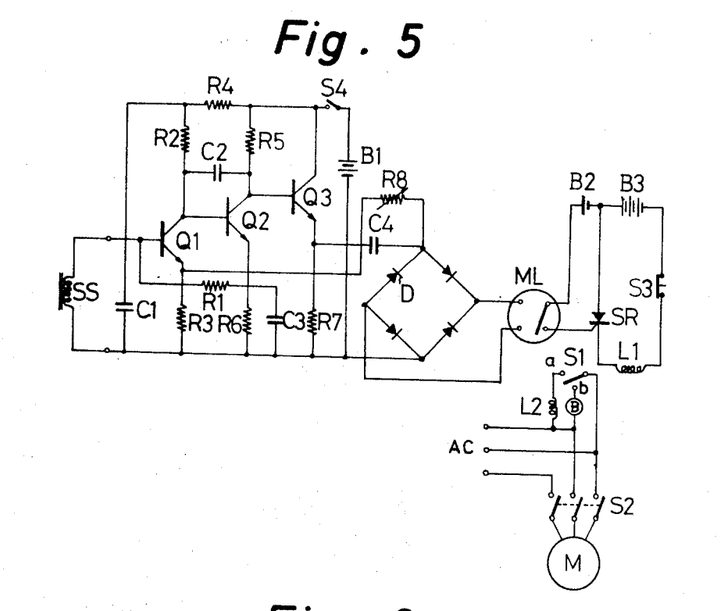
FIG. 5 is a control circuit of an embodiment of the invention.

One embodiment of the circuit including the detectors SS, amplifier AMP, and control circuit CC is shown in FIG. 5, wherein the detectors SS are formed with induction coils. The amplifier AMP consists of transistors Q1 - Q3, resistors R1 - R8, and capacitors C1 - C4, with a power source B1 connected through a switch S4 to the circuit, the output of which is applied through capacitor C4 to a rectifier circuit comprising diodes D connected in a bridge. The rectifier output is applied to a meter relay ML. When longitudinal cracks are detected, its contact is closed. A voltage from the power source B2 is applied to the gate of a thyrister SR, which in turn becomes conducting. A current will flow from a power source B3 to a relay L1. The contact S1 is then switched over from contact $a$ to contact $b$. Relay L2, therefore, becomes de-energized and its contact S2 opens to disconnect a three-phase AC power source AC. Therefore, the motor M stops and an alarm can be actuated to announce the appearance of longitudinal cracks. S3 represents a reset switch, which is opened to return the circuit to its former condition.

Figure 6:
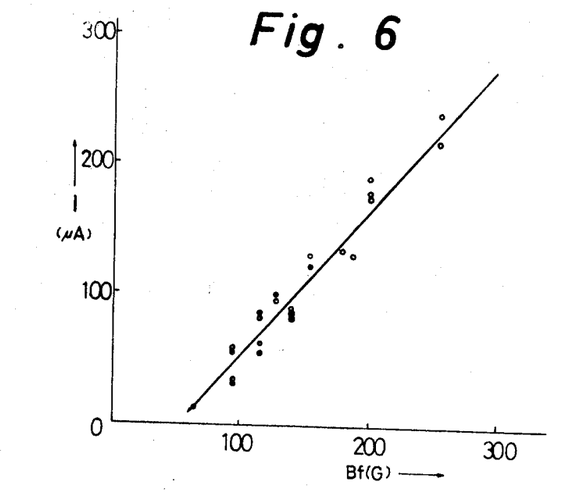
FIG. 6 is a diagram showing the relationship of density of a magnetic flux with detecting sensitivity of rubber magnets.

The relationship of surface flux density Bf (Gauss) of the rubber magnet 5 with the indicating current value I ($\mu$A) of the meter relay ML is shown in FIG. 6, where the speed of traveling of the belt 1 is given as 150 m/min. It is seen that the current value is 50 $\mu$A when the surface flux density is 100G and 170 $\mu$A when it is 200G. If the working point of the meter relay ML is set up at greater than 50 $\mu$A, the rubber magnet 5 is sufficient to have the surface flux density more than 100G.

Figure 7:
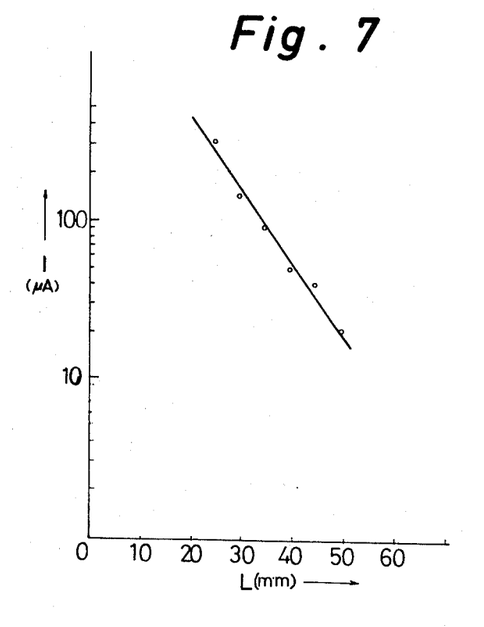
FIG. 7 is a diagram showing the relationship of the distance with the detecting sensitivity of the detector means in the conveyor belt.

In FIG. 7 is shown variations of indicating current value I of the meter relay ML with respect to the distance L between the belt 1 and the detectors SS, where the surface flux density in the rubber magnet 5 is 250G and the traveling speed of the belt 1 is 150 m/min.

Similar to the above-mentioned case, if the working point of the meter relay ML is preset at greater than 50$\mu$A, the detector SS may be set up at a distance L which is less than 40mm so as to carry out the detection of longitudinal cracks.

The higher the surface density of magnetic flux for the rubber magnet 5, the greater the sensitivity of detection. In order to secure a large surface flux density, it is desired to increase the mixing rate of ferrite powders relative to the rubber or to provide large dimensions for the ferrite powders. Weight ratios of the mixture of rubber and ferrite powders indicated as A are shown in Table 1, together with their mechanical and magnetic characteristics.

TABLE 1

Hc 1,500 BaO·6Fe₂O₃   Br 2,000

| A | 1:1 | 1:2 | 1:3 | 1:4 | 1:5 | 1:6 | 1:8 | 1:10 | 1:12 |
|---|---|---|---|---|---|---|---|---|---|
| Hardness (JIS) | 51 | 60 | 68 | 70 | 80 | 85 | 89 | 94 | 97 |
| Tensile strength (kg./cm.²) | 140 | 112 | 100 | 82 | 65 | 64 | 61 | 48 | 22 |
| Elongation (percent) | 600 | 550 | 500 | 420 | 350 | 100 | 40 | 25 | 10 |
| Br (G) | 100 | 500 | 800 | 1,000 | 1,120 | 1,200 | 1,400 | 1,800 | 1,900 |
| Hc (oe.) | 85 | 420 | 660 | 840 | 940 | 1,050 | 1,180 | 1,360 | 1,440 |

In the table, Br designates the residual density of magnetic flux (G) and Hc the coercive force (Oe). The ferrite powders are barium ferrite (BaO·6Fe₂O₃), where Hc = 1,500 and Br = 2,000. If there is required a surface density of magnetic flux more than 100G, the weight ratio A of the mixture may be provided more than 1:1. If the weight ratio A is about 1:12, the product will lose its flexibility and it will readily break. Therefore, it is required to set the mixture weight ratio A below 1:10. The relationship between thickness and surface density of magnetic flux of the rubber magnet is shown in Table 2.

TABLE 2

| Thickness (mm) | 0.5 | 1 | 2 | 3 | 4 | 5 | 6 |
|---|---|---|---|---|---|---|---|
| Density of Magnetic Flux | 75 | 130 | 200 | 269 | 330 | 400 | 500 |

For example, a rubber magnet has a width of 10 mm and a length of 100 mm with N and S poles located transversely on the surface thereof and it has a weight ratio of 1:8. If the surface density of magnetic flux is required to be more than 100G, its thickness must be more than 1mm. However, the thickness of the cover rubber of the belt 1 is generally about 2-6 mm so that the thickness of the rubber magnet may preferably be in the range of 1-5 mm, since the thickness of the rubber magnet 5 must be limited so as to provide the rubber magnet 5 below the cover rubber 7. Besides, the width of the magnet must be preferably determined relative to the radius of curvature of the pulleys 2 and 3. An excessively large width is not desirable. A most suitable width is about 10 mm.

The magnetic body 6 performs magnetic shortcircuiting of magnet 5 and it must be of a size sufficient for use without being magnetically saturated. Preferably, it may be so large as to cover the magnetizing surface of the rubber magnet 5.

An iron plate of about 0.2-1 mm thickness is most suited for the objective. The magnetic body 6 may be conveniently divided such that it can be immediately displaced from the rubber magnet 5 when the longitudinal cracks occur. It is possible to have the magnetic body 6 made of rubber mixed with a large amount of magnetic powders. This avoids the characteristics of the belt 1 being greatly damaged. Also, by providing different mechanical characteristics to the belt as distinguished from the rubber magnet 5, the belt can be made displaceable from the rubber magnet 5 when the longitudinal cracks are produced as in the case of iron plates. 16

The conveyor belt 1 of longer than several hundred meters in length has embedded within it a cable 8. This cable is not magnetically connected at the joint part of the belt 1, so that the magnetic flux of the rubber magnet 5 would leak from the joint part through the cable 8 to the outside. When the longitudinal cracks are not produced or when the rubber magnet 5 is magnetically shortcircuited by magnetic body 6 and the signal voltage detected by the detector SS is about 2 mV, there is detected only a signal voltage of about 1.5 mV. Then, the erroneous operation is not effected from the joint part. Furthermore, when the longitudinal cracks are produced, there is obtained a signal voltage of about 40 mV, which would vary in the amount about 20 times the initial signal voltage. It is, therefore, easy to have the belt unaffected by magnetism generated for example by magnetite. If an induction coil is used as the detector SS, the detecting signal voltage becomes great as long as the traveling speed of the belt 1 is great. This detector is most suited for the belt in high speed operation.

The signal voltage which is detected in as small amounts as 2mV, is generated in a pulse form because the rubber magnets 5 are embedded nearly at equal fixed intervals. This pulse may be applied in a suitable circuit to supervise the normal operation of the belt 1. If the longitudinal cracks would occur, the signal voltage will become larger. The signal voltage larger than a predetermined amount then may be used as a detection signal for cracks.

The detector of the above-mentioned embodiment thus can detect the longitudinal cracks by the rubber magnet identical in material with the belt. It is so characterized that it can detect the longitudinal crack with much certainty while it will not deteriorate the characteristics of the belt. Since the magnetic body is thin in thickness, it is not probable to produce erroneous operation unless it is displaced greatly from the rubber magnet even though it may be cut off in the course of travelling of the belt.

In case the belt 1 is large in width, it frequently occurs that the magnetic body 6 is cut together with the rubber magnet 5. This drawback is overcome by the present invention as incorporated in the embodiment of FIG. 8. As will be apparent from the drawing, pairs of the rubber magnets 5 and the magnetic bodies 6 are disposed in a zigzag arrangement on the belt surface. The rubber magnet 5 and the magnetic body 6 in pair are partly laid one upon another in the longitudinal direction. Although the belt 1 is large in width, the magnetic body 6 surely displaces from the rubber magnet 6 by influence of the longitudinal crack portion a.

Figure 8:
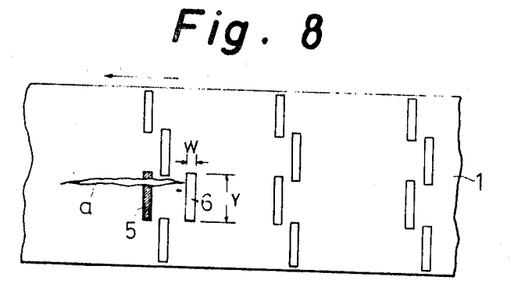
FIGS. 8 and 9 are plan views showing an arrangement of the rubber magnets of another embodiment of the invention.

In this connection, past experiments have proved that the magnetic body 6 could certainly displace the magnetic body 6 by longitudinal cracks due to relation between the adhering force of the magnetic body 6 to the belt 1 with the displacing force of the magnetic body caused by longitudinal crackings. Experiments have been successful if the values of Y, X and W are so chosen that $Y \leq 335x + 185$ provided that $0.3 \leq x \leq 1.5$ and $W < 20$ mm; wherein the length of the magnetic body 6 is given by Y (mm); the thickness by X (mm) and the width by W. The width W is at least 20 mm or less and most preferably 8 mm. Detailed requirement for the above referred formula will be described further below.

The belt 1 is approximately of U-shape in cross section or trough-form in normal condition of use. Owing to this belt shape, the thickness $x$ of the magnetic body 6 must be less than 1.5 mm in order to prevent it from breaking through the cover rubber by repetition of bending. If the thickness $x$ is made less than 0.3 mm, the magnetic body may broken without being displaced from the rubber magnet 5. This condition necessitates the requirement of $0.3 \leq x \leq 1.5$. Moreover, when the magnetic body 6 passes over the pulley, the magnetic body 6 cannot bend easily on the pulley if the width W of the magnetic body 6 is too wide and the difficulty of the bending would damage the belt 1. If the magnetic body 6 is too wide, it cannot follow the bending of the belt 1 and cuts through the belt 1. Thus, the width W of the belt must be less than 20 mm.

An experiment on the relationship of the thickness $x$ and length Y of the magnetic body 6 will now be described. In the experiment a belt was employed containing 40 steel wires each of 4.1 mm size and 15 mm pitch; pulleys with a diameter of 500 mm and the interval between pulleys 5 m; velocity of belt 100 m/min, and 30° trough carriers in 5 units. In the experiment, a cutter of width 5cm and length 5 cm was pierced into the belt intentionally to find out the relationship of the rubber magnet and the magnetic body. The following result was obtained from this experiment.

TABLE 3

| X (mm) | Y (mm) | Magnetic Body Position |
|---|---|---|
| 0.3 | 250 | cut |
| 0.5 | 250 | displaced not being cut |
| 0.5 | 360 | cut |
| 1.0 | 360 | displaced not being cut |
| 1.0 | 600 | cut |
| 1.5 | 600 | displaced not being cut |
| 1.5 | 700 | cut |

As a result, the magnetic body must meet the requirement of $Y \leq 335x + 185$, $0.3 \leq x \leq 1.5$, and $W < 20$. The magnetic body satisfying this requirement can well detect the longitudinal cracks by its displacement from the rubber magnet.

As hereinbefore described, one embodiment of the invention of the above disclosure comprises the rubber magnet and the magnetic body close to the magnetic pole of the rubber magnet, which are located transversely of the belt in a zigzag arrangement with the rubber magnet and the magnetic body superimposed partly upon each other. With this arrangement, even with the belts which are wide in width the occurrence of longitudinal cracks can be readily detected. Normally, the magnetic body is shorter in length than the width of the belt and will not affect the flexibility of the belt. A partially superimposed arrangement in the longitudinal direction further makes it possible to detect the longitudinal cracks occurring at any point on the belt.

The rubber magnet 5 is magnetically short circuited by the magnetic body 6. The magnet does generate a slight leakage magnetic flux. If, for example, the intensity of the leakage magnetic field is represented by 1 and the intensity of the outer magnetic field caused from displacement of the magnetic body 6 is given by 10, where the rubber magnet 5 is embedded in 10 units in the transverse direction of the belt, the intensity of the magnetic field relative to the detectors SS provided parallel with the width of the belt is 10 during normal operation and the intensity of the magnetic field relative to the detector SS is 19 when the magnetic body 6 of one rubber magnet 5 is displaced by the occurrence of a longitudinal crack.

Thus, the intensity of the magnetic field relative to the detector SS is almost doubled by the longitudinal cracks. The difference of the intensities is then detected and as a result the longitudinal cracks are detected.

Sometimes it occurs that the intensity of the magnetic field influencing the detector SS from one rubber magnet 5 is less than 10 by occurrence of the longitudinal cracks, whereupon the variation of the outside magnetic field will be lessened and the detection will not be surely effected. Likewise, if a large shock or vibration is applied to the belt 1 when it passes over the detector SS or a noise signal is additionally superimposed, a detection signal of the detector SS is generated as though the outside magnetic field has greatly changed, and causes an erroneous operation. This problem may be avoided by providing a large difference in the detection level between the normal operation and the occurrence of longitudinal cracks. However, it is not possible to detect the cracks when the detecting level upon occurrence of the longitudinal cracks is lower than the desired condition and therefore it is not capable of exactly detecting the cracks.

Figure 9:
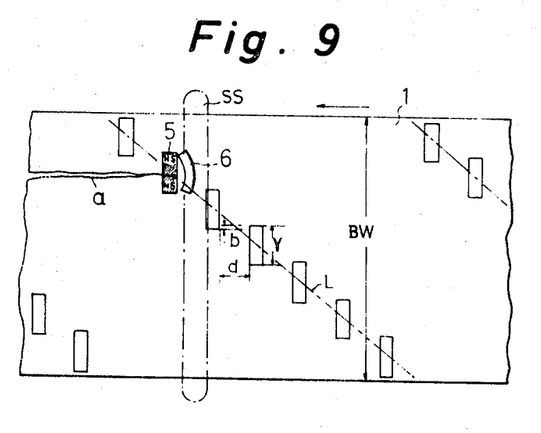

The above drawbacks have been improved in the embodiment of FIG. 9. In the embodiment, the detector SS is provided in parallel with the transverse direction of the belt 1. The rubber magnet 5 and the magnetic body 6 on the surface thereof have a length shorter than the width BW of the belt 1. The rubber magnets and magnetic bodies are consecutively arranged in parallel with the transverse direction of the belt along the line L obliquely inclined relative to the transverse direction thereof, and at sapced intervals from each other. Thus, the rubber magnet 5 is disposed at intervals longitudinally of the belt 1. It is so arranged that an end of the rubber magnet 5 may overlap an end of the next magnet by a length $b$ in the transverse direction. The length Y of the individual rubber magnets may be preferably determined with consideration of the residual magnetism, flexibility and width of the belt 1. The length $b$ may be determined selectively with reference to the interval $d$, which may desirably but not necessarily be equal to other intervals. The line L therefore may be rectilinear in form.

In the construction as above dewcribed, the intensity of the magnetic field relative to the detector SS from one rubber magnet 5 in the normal operation may be represented by 1 and the intensity of the magnetic field relative to the detector SS when the magnetic body 6 is displaced from the rubber magnet 5 by appearance of the longitudinal cracks may be given by 10. The belt moves in the direction shown by the arrow and the rubber magnet 5 adjacent to the detector SS will not be more than one so that the intensity of the magnetic field during normal operation will be 1 and it will become 10 by appearance of the longitudinal cracks. The intensity of the magnetic field from the normal operation will increase 10 times by the appearance of longitudinal cracks. Thus, other conditions will not greatly affect the matter.

Figure 10:
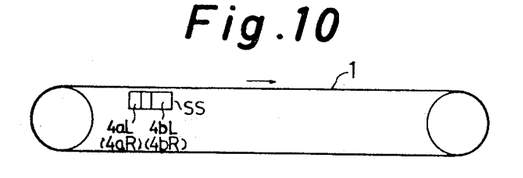
FIG. 10 is a diagrammatic side view of another embodiment of the conveyor belt according to the invention.
Figure 11:
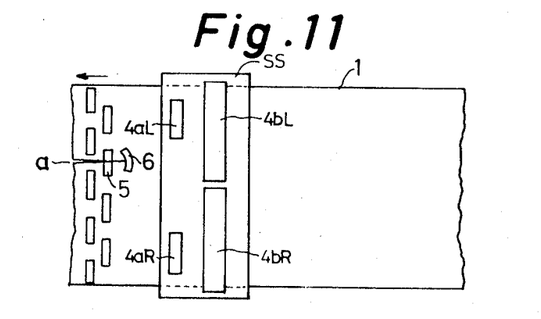
FIG. 11 is a plan view of an essential portion of FIG. 10.

FIG. 10 is a diagrammatic side view of still another embodiment of the present invention and FIG. 11 is a plan view of that embodiment. The location of the detectors SS relative to the belt 1 is preferably selected so as to readily detect the magnetic flux of the rubber magnet 5 embedded in the belt 1. The detector SS consists of auxiliary detecting elements 4$a$L, 4$a$R and main detecting elements 4$b$L, 4$b$R. The auxiliary detecting elements 4$a$L, 4$a$R firstly detect the magnetic flux of the rubber magnet 5 embedded in the belt 1 moving in the direction of the arrow and process the detecting signal in conjunction with the main detecting elements 4$b$L, 4$b$R which subsequently detect the flux. Only when a detecting signal is simultaneously generated is there a determination. If the main detecting elements 4$b$L, 4$b$R have the identical detecting signals, it is judged as a normal condition. if either one is relatively larger, it is judged that there is generated a longitudinal crack. This is because the detection signal is produced even from leakage magnetic flux of the rubber magnet 5 which has been magnetically short circuited by the magnetic body 6. For instance, if this leakage magnetic flux is represented by a value of 1 and the magnetic flux when the magnetic body 6 is displaced by occurrence of longitudinal cracks is given by 10, then normally one main detecting element 4$b$L generates a detecting signal of 5 and the other main detecting element 4$b$R generates a detecting signal corresponding to the leakage magnetic flux of 5, when, for instance, 10 units of rubber magnet 5 are embedded. If the difference of the detecting signals of the main detecting elements 4$b$L, 4$b$R is sought for, it is found to be zero. However, with longitudinal cracks, for example, one main detecting element 4$b$L may receive a detecting signal corresponding to the magnetic flux of 5, while the other will detect a signal of 14. Then, the difference of the two detecting signals is 9. Therefore, it is seen that the longitudinal crack can be surely detected. Moreover, where the belt is right with embedded steel wires and where these steel wires normally have high carbon steel, the belt is sometimes partially magnetized, and the detection of the longitudinal cracks only from the mangitude of the magnetic field results in an erroneous operation. In this embodiment, however, the detection of longitudinal cracks is performed only when the detection signals are first generated simultaneously in both of the auxiliary detecting elements 4$a$L, 4$a$R. Even if a non-uniform magnetic field is present between the rubber magnets 5, there must not be effected such erroneous operation. If, accidentally, there is present something in the belt 1 to generate a magnetic field other than the rubber magnets at left and righ positions of the belt, the detection may be started. If the left and right magnetic fields are equal even if the detection is started, it will not be determined that longitudinal cracks have been generated. Thus, the left and right magnetic fields may be balanced by embedding the rubber magnets upon installation of the conveyor belt.

Figure 12:
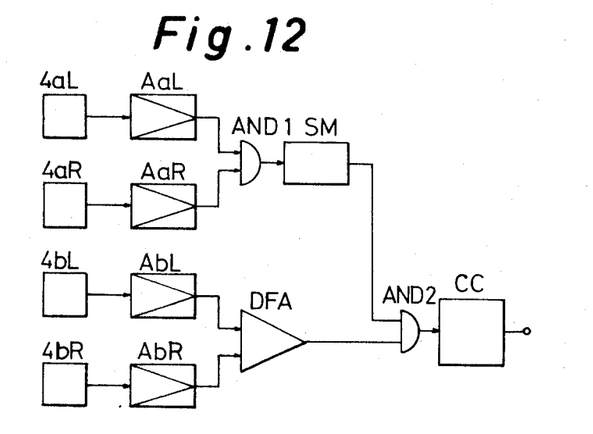
FIGS. 12 and 13 are block diagrams respectively of other embodiments.

FIG. 12 is a block diagram showing an embodiment of a detection circuit for carrying out the above described-operation. In the figure, A$a$L, A$a$R, A$b$L, and A$b$R designate amplifiers; and AND 1, AND 2 designate AND-circuits; DFA designates a differential amplifier; SM designates a one-shot multivibrator, and CC designates an output control circuit. The AND-circuit 1 issues an output when the detecting signals of the auxiliary detecting elements 4$a$L, 4$a$R are simultaneously generated. The one-shot multivibrator SM is provided for obtaining the output of the AND 1 circuit for the duration of time corresponding to the time difference between the detecting signal of the auxiliary detecting elements 4$a$L, 4$a$R and the detecting signal of the main detecting elements 4$b$L, 4$b$R. If this time difference can be precisely set up, the circuit can be replaced with a delay circuit. Otherwise, a pluse width expansion circuit can be adopted as an alternative. The differential amplifier DFA is intended to obtain a difference of the detecting signal of the main detecting elements 4$b$L, 4$b$R. When this difference output and the output of the one-shot multi-vibrator SM are generated at the same time, there is generated an output of the AND 2 circuit to trigger the output control circuit cc to indicate that longitudinal cracks have been generated or to stop the belt driving motor and sound an alarm.

Figure 13:
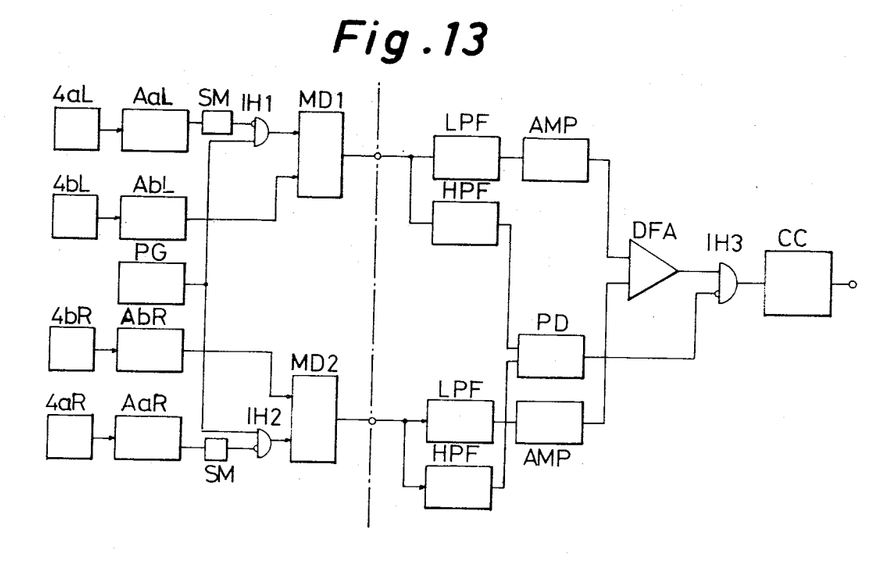

FIG. 13 is a block diagram of another detector circuit for the last embodiment of the invention. In the figure, identical numerals denote identical parts as in FIG. 12. In this embodiment, PG denotes a pulse generator, IH1, IH 2, IH3 denote inhibit gate-circuits; MD1, MD2 denote modulation circuits; LPF is a low pass filter; HPF is a high pass filter; PD is a pulse detection circuit, and AMP is an amplifier. The pulse generator PG has a pulse output much higher in frequency than the detecting signal of the main and auxiliary detecting elements. The detecting signal of the main detecting elements 4bL, 4bR are modulated in the modulation circuits MD1, MD2 by this pulse out. However, the above modulation is not effected when the inhibit gate circuits IH1, IH2 are closed for a time after the detecting signal is generated by the one-shot multivibrator SM actuated by the detection signal of the auxiliary detecting elements 4aL, 4aR. The modulated detecting signals of the main detecting elements 4bL, 4bR are sent to the low pass filter LPF and high pass filter HPF. The pass band of the high pass filter HPF is set up for the pulse output of th pulse generator PG, so that the detecting signal of the main detecting elements 4bL, 4bR passes through the low-pass filter LPF and is amplified by the amplifier AMP. Thereafter, its difference is obtained in the differential amplifier DFA. The difference output passes through th inhibit gate circuit IH3 and triggers the output control circuit cc when the output of the pulse detecting circuit PD is not present. When the detecting signal is not generated simultaneously in the auxiliary detecting elements 4aL, 4aR, however, the pulse output of th pulse generator PG passes through the high-pass filter and is detected in the pulse detecting circuit PD, the output of which inhibits gate IH3 and the output of the differential amplifier DFA is not sent to the output control circuit cc. In this embodiment, the left side of the broken line is provided for detection purposes, whereby two signal lines are required and it will not cause erroneous operation resulting from noise signals.

The above described embodiment provides for detection of longitudinal cracks by the main detecting elements, only when a detecting signal is generated simultaneously in the auxiliary detecting elements 4aL, 4aR. The device does not cause erroneous operation from the unnecessary magnetic field due to reinforcing steel wires. Detecting longitudinal cracks is by the difference output of the detecting signal of the main detecting elements 4bL, 4bR which increases the detecting sensitivity most effectively. The invention is not confined only to the above described embodiments but it can broadly be modified in application for various purposes and is limited only by the scope and spirit of the invention as claimed in the appended claims.

What we claim as new and desire to secure by Letters Patent is:

1. Apparatus for detecting cracks in a conveyor belt comprising
   rubber magnets coupled to a conveyor belt,
   magnetically conducting means coupled to the conveyor belt and covering said rubber magnets to effectively magnetically short circuit said rubber magnets; and
   detector means adjacent the belt for detecting the external magnetic field generated by said rubber magnets.

2. Apparatus for detecting cracks in a conveyor belt comprising
   magnetic means coupled to a conveyor belt,
   magnetically conducting means coupled to the conveyor belt and associated with said magnetic means to effectively magnetically short circuit said magnetic means; and
   detector means adjacent the belt for detecting the external magnetic field generated by said magnetic means, wherein said magnetic means are comprised of a mixture of rubber and ferrite materials, and said magnetically conducting means is of an iron material.

3. Apparatus as in claim 2 wherein said magnetic means are comprised of a plurality of individual magnets transversely positioned with respect to the belt and longitudinally spaced from each other, and said magnetically conducting means are comprised of a plurality of individual magnetic plates each positioned over one of said magnets.

4. Apparatus as in claim 3 wherein said magnets and plates are embedded within the belt.

5. Apparatus as in claim 3 wherein each of said individual magnets and magnetic plates associated therewith are further comprised of elements thereof arranged in staggered relationship wherein adjacent ones of said elements are longitudinally spaced and transversely overlapped.

6. Apparatus as in claim 5 wherein said staggered relationship forms a zigzag arrangement.

7. Apparatus as in claim 5 wherein said staggered relationship forms a stepwise arrangement.

8. Apparatus as in claim 3 wherein said detector means is positioned transversely with respect to the belt.

9. Apparatus as in claim 3 wherein the width of each of said magnetic plates is less than twenty millimeters. The thickness of said magnetic plate is between 0.3 mm and 1.5 mm and the length of said plates is less than 185 mm plus 335 times the thickness thereof.

10. Apparatus as in claim 2 wherein said detector means comprises first and second detectors positioned colinearly and transverse to the belt, each producing a signal proportional to the magnetic field detected, and comparison means for comparing the signals from said detectors and producing an output when said signals are unequal.

11. Apparatus as in claim 2 wherein said detector means comprises first and second auxiliary detectors positioned colinearly and transverse to the belt and each producing an auxiliary signal upon detecting a magnetic field, first and second main detectors positioned colinearly transverse to the belt and longitudinally spaced from said auxiliary detectors and each producing a main signal proportional to the magnetic field detected, and comparison means for comparing said main signals and producing an output related to the difference of said main signals only when said auxiliary signals are simultaneously produced.

12. Apparatus as in claim 11 wherein said comparison means further comprises:
   first gating means producing an output at the simultaneous occurrence of said auxiliary signals, multivibrator means actuated by said first gating output and producing an enabling signal, difference detection means for obtaining the difference between said main signals and producing a difference signal, second gating means enabled by said enabling signal to pass said difference signal, and an output control circuit triggered by the differnce signal from said gating means and providing a detection output.

13. Apparatus as in claim 11 wherein said comparison means further comprises:

first and second multivibrator means each triggered respectively by the outputs of said first and second auxiliary detectors and producing respectively a first and second inhibit pulse, pulse generating means producing a pulse output, first and second gating means for passing said pulse output in the absence of said respective first and second inhibit pulses, first and second modulating means receiving said pulse output respectively from said first and second gating means and respectively modulating thereon said main signals, first and second filter means receiving the modulated signals and each producing a pulse signal related to the modulated signal and a detection signal related to the modulating signal, difference detection means for producing a difference signal related to the differene between the detection signals from said first and second filter means, pulse detection means for comparing the pulse signals from said first and second filter means and producing a disabling signal, third gating means for passing said difference signal in the absence of said disabling signal, and output control means triggered by the difference signal from said third gating means and providing a detection output.

14. In a conveyor belt system comprising a conveyor belt, pulley means and driving means apparatus for detecting cracks in said belt, said apparatus comprising:

rubber magnets coupled to said belt, magnetically conducting means coupled to the conveyor belt and covering said rubber magnets to effectively magnetically short circuit said rubber magnets, and detector means adjacent the belt for detecting the external magnetic field generated by said magnetic means and stopping said driving means.

* * * * *